Jan. 10, 1967 H. J. FUMEA, JR 3,298,025

PULSE TO PULSE POWER CONTROL SYSTEM

Filed July 8, 1965 2 Sheets-Sheet 1

INVENTOR.
HARRY J. FUMEA, Jr.
BY Harry A. Herbert Jr. and George Line
ATTORNEYS

INVENTOR.
HARRY J. FUMEA, Jr.
BY Harry A. Herbert Jr. and George Fine
ATTORNEYS

United States Patent Office 3,298,025

Patented Jan. 10, 1967

3,298,025

PULSE TO PULSE POWER CONTROL SYSTEM

Harry J. Fumea, Jr., Baltimore, Md., assignor to the United States of America as represented by the Secretary of the Air Force Filed July 8, 1965, Ser. No. 470,655
2 Claims. (Cl. 343—17.1)

This invention relates to a system for controlling the output power level of a pulse to pulse radar transmitter as a function of the operating frequency, and more particularly, to the control as a function of frequency of the collector voltage of a travelling wave tube amplifier included in the radar transmitter.

In high power broad band transmitters of modern radars it is often important to be able to control the output power level as a function of the operating frequency. The present invention provides an effective system of controlling the output power level of a broad band transmitter on a pulse to pulse basis where the frequency changes on every radar pulse.

An object of the present invention is to provide a system to control the output power level of a broad band transmitter on a pulse to pulse basis.

Another object of the present invention is to provide a system for controlling the output power level of a pulse to pulse radar transmitter as a function of the operating frequency.

Yet another object of the present invention is to provide a system of accurately controlling the power output level of a transmitter as the operating frequency changes from pulse to pulse.

The features of this invention, which are believed to be new, are set forth with particularity in the appended claims. The invention itself, however, together with further objects and advantages thereof may best be understood by reference to the following description when taken in conjunction with the accompanying drawings, in which:

Figure 1:
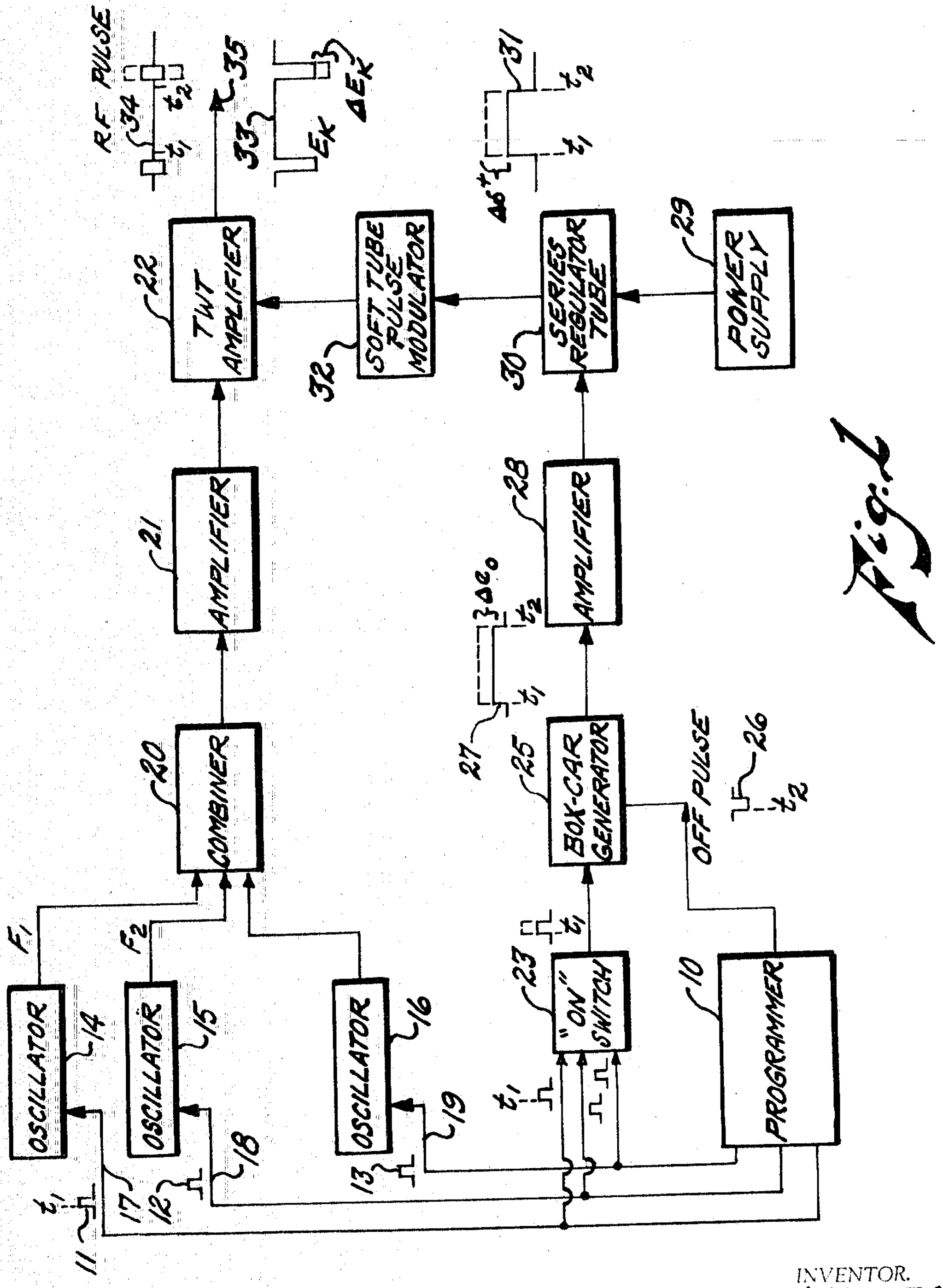
FIG. 1 shows in block diagram form a preferred embodiment of the present invention.

Now referring in detail to FIGURE 1, there is shown programmer 10 which provides output gate pulses 11, 12 and 13 to gated oscillators 14, 15, and 16 by way of line 17, 18, and 19, respectively. Only one output gate pulse is in the "ON" state at any one time. Therefore, as programmer 10 shifts from channel to channel, each respective oscillator is gated on and its particular frequency will appear at the final output thereof. For example, the output of oscillator 14 will have a frequency of F1; oscillator 15, a frequency of F2; and oscillator 16, a frequency of F3. Using this method, the transmitting frequency can be changed every pulse repetition frequency.

The outputs of oscillators 14, 15, and 16 are passed through combiner 20 and amplifier 21 and received by travelling wave tube amplifier 22.

Oscillator gate pulses 11, 12, and 13 are also sent through "ON" switch 23 which turns on box-car generator 25.

Figures 2, 3:
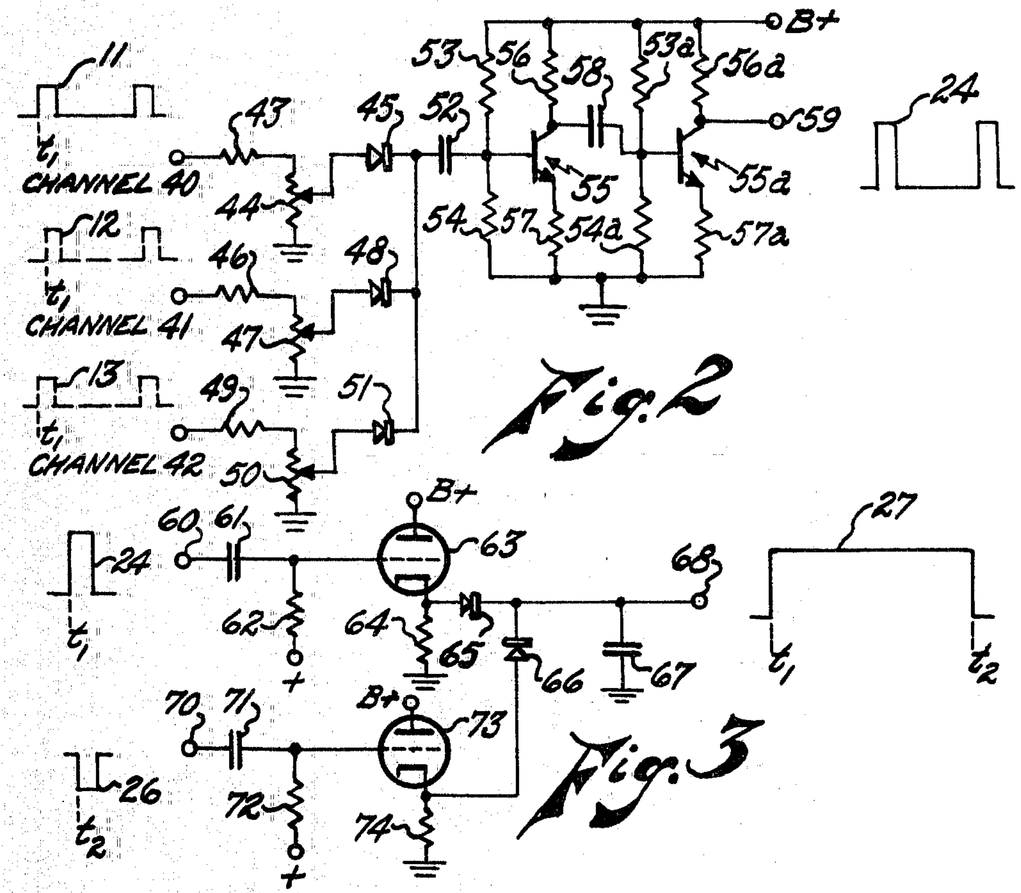
FIG. 2 shows a schematic diagram of the "on switch" component of FIG. 1.
FIG. 3 shows a schematic diagram of the box-car circuit shown in FIG. 1.

Now referring to FIGURE 2, there is shown a schematic diagram of "ON" switch 23 of FIGURE 1 wherein pulses 11, 12, and 13 are received by channels 40, 41, and 42, respectively, for passage therethrough. When a pulse is applied to any channel from programmer 10, "ON" pulse 24 will be obtained at terminal 59. By adjusting potentiometers 44, 47, and 50, "ON" pulse 24 can be varied to the appropriate level for channel 40, 41, and 42, respectively.

Figure 4:
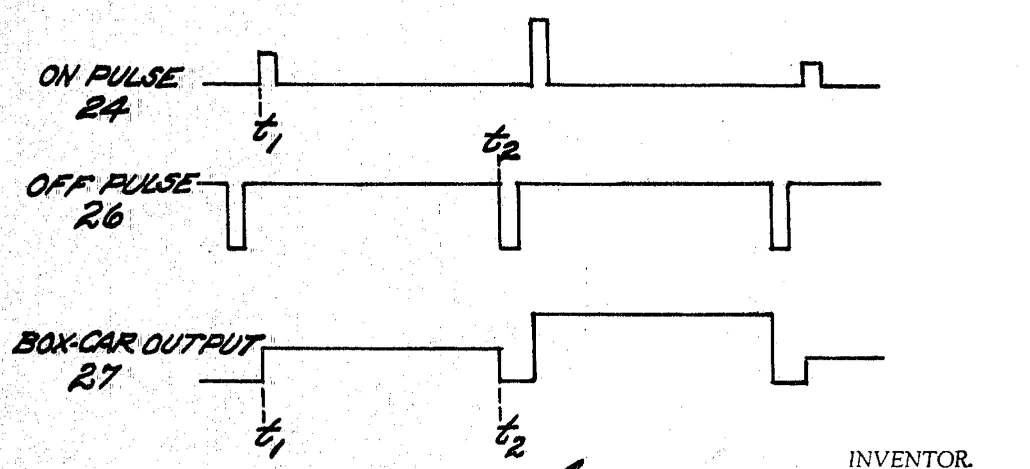
FIG. 4 shows the input-output waveforms associated with the box-car circuit of FIG. 3.

Now referring again to FIGURE 1, box-car generator 25 is turned on by pulses passed through "ON" switch 23. At the output of "ON" switch there is shown "ON" pulse 24. "OFF" pulse 26 is also applied to box-car generator 25. The box-car generator produces at its output long pulse 27 which is spaced between R.F. output pulses 34 in time as a result of application thereto of "ON" pulse 24 and "OFF" pulse 26. Box-car generator 25 is shown in schematic form in FIGURE 3. When "ON" pulse 24 having an amplitude of *e* (in) is received by terminal 60, capacitor 67 charges through electron discharge device 63 and diode 65 to a voltage equal to the original D.C. voltage amplitude of *e* (in). Since electron discharge device 63 is a cathode follower, exhibiting a very low output impedance, the charge time is very short. Diode 66 is biased OFF with the D.C. voltage across resistor 74. Capacitor 67 will remain charged until "OFF" pulse 26 causes diode 66 to conduct, at which time capacitor 67 discharges rapidly through cathode follower 73. Note that the pulse output voltage 27 charges to an amplitude equal to the amplitude of *e* (in) and therefore can be varied by varying the amplitude of *e* (in). The input-output waveforms associated with the box-car generator are shown in FIGURE 4.

Now referring again to FIGURE 1, box-car output pulse 27 is passed through amplifier 28 and received by series regulator tube 30. Series regulator tube 30 also receives a B+ input voltage from power supply 29. The series regulator tube effectively varies the B+ voltage applied to soft tube pulse modulator 32. The waveform from series regulator tube 30 which is applied to soft tube pulse modulator 32 is shown as pulse 31.

Output pulse 33 from soft tube pulse modulator 32 is received by traveling wave tube amplifier 22 to control the amplitude of its collector voltage ($E_k$) which in turn controls the RF power output level available at terminal 35. The output RF is shown as waveform 34. Therefore, the output power level is proportional to the controlled voltage level of the "ON" pulse at the output of the "ON" switch. Thus there is provided a system for controlling the output power level of a pulse to pulse radar transmitter as a function of the operating frequency by controlling the collector voltage of a travelling wave tube amplifier as a function of frequency.

It is to be noted that the above-described system also provides a method of accurately controlling the power output level as the operating frequency changes from pulse to pulse. Without this control, the transmitter chain could not operate at its optimum power level at any frequency. This method of power control is especially useful when higher power TWT tubes are driven by frequency agile systems (like FIG. 1) since they usually require different input power levels at different frequencies to obtain a constant power output.

What is claimed is:

1. In a system for controlling the power output level of a travelling wave tube amplifier on a pulse to pulse basis where the frequency changes on every pulse comprising a multiplicity of gated oscillators, each of said oscillators having a different preselected frequency, means to generate at preselected times a separate gating pulse for each of said oscillators, only one of said pulses being operative at any one time, a travelling wave tube amplifier with the power output level therefrom being a function of the magnitude of voltage applied to the collector thereof, said travelling wave tube amplifier receiving the output signals from said gated oscillators, a soft tube modulator having the output thereof connected to said collector, a power supply connected to said modulator by way of a series regulator tube, a box-car generator having two input signals, the first being said operative gating pulse to actuate said box-car generator to provide an output pulse therefrom, and the second input signal being a pulse having a preselected delay to discharge said output pulse, said box-car generator output pulse having an amplitude equal to that of said first input pulse, and an amplifier interconnecting said series regulator tube and said box-car generator to provide a signal to said series regulator tube to control the output amplitude thereof.

2. In a system for controlling the power output level of a travelling wave tube as defined in claim 1, further including switch means, receiving said operative gating pulses and passing one of said operative gating pulses to said box-car generator.

No references cited.

CHESTER L. JUSTUS, *Primary Examiner.*
D. C. KAUFMAN, *Assistant Examiner.*